United States Patent
Bergan

(10) Patent No.: US 10,087,971 B1
(45) Date of Patent: Oct. 2, 2018

(54) PLANETARY STAPLER FOR ELECTRICAL WIRING AND THE LIKE

(71) Applicant: Joshua T. Bergan, West Tisbury, MA (US)

(72) Inventor: Joshua T. Bergan, West Tisbury, MA (US)

( * ) Notice: Subject to any disclaimer, the term of this patent is extended or adjusted under 35 U.S.C. 154(b) by 22 days.

(21) Appl. No.: 15/287,441

(22) Filed: Oct. 6, 2016

Related U.S. Application Data

(60) Provisional application No. 62/239,003, filed on Oct. 8, 2015.

(51) Int. Cl.
*F16B 35/06* (2006.01)
*F16B 35/00* (2006.01)

(52) U.S. Cl.
CPC .............. *F16B 35/00* (2013.01); *F16B 35/06* (2013.01)

(58) Field of Classification Search
CPC ........................................................ F16B 35/06
USPC ........................... 81/57.22; 174/159; 411/402
See application file for complete search history.

(56) References Cited

U.S. PATENT DOCUMENTS

| | | | | |
|---|---|---|---|---|
| 5,295,756 A * | 3/1994 | Ohta | ................... | H01R 13/6215 403/11 |
| 5,312,023 A | 5/1994 | Green et al. | | |
| 5,406,596 A * | 4/1995 | Malmasson | ............. | B23P 19/06 376/203 |
| 5,411,228 A * | 5/1995 | Morawa | ..................... | F16L 3/04 174/135 |
| 6,205,617 B1 * | 3/2001 | Held | ..................... | E05D 7/0407 16/236 |
| 6,305,245 B1 * | 10/2001 | Kress | ..................... | B23P 19/069 81/57.14 |
| 6,378,813 B1 * | 4/2002 | Gretz | ........................ | F16L 3/04 248/68.1 |
| 6,543,667 B2 | 4/2003 | Yoshie et al. | | |
| 6,668,685 B2 * | 12/2003 | Boston | .................. | B23P 19/069 81/57.22 |
| 7,546,988 B1 * | 6/2009 | Schecter | ................... | F16L 3/04 248/65 |
| 7,637,182 B1 * | 12/2009 | Long | ..................... | B23P 19/069 81/57.22 |
| 7,836,796 B2 * | 11/2010 | Chang | ..................... | B25B 17/00 81/57.22 |
| 8,381,619 B2 * | 2/2013 | Hung | ..................... | B25B 17/02 81/57.22 |
| 8,616,431 B2 | 12/2013 | Timm et al. | | |
| 8,931,682 B2 | 1/2015 | Timm et al. | | |

(Continued)

*Primary Examiner* — Gary W Estremsky
(74) *Attorney, Agent, or Firm* — Nexsen Pruet, LLC; Michael A Mann

(57) ABSTRACT

A device for fastening electrical wiring and the like to a support may include a tool with a bit, a housing, a central gear configured to be driven by the tool bit, two opposing planetary gears positioned to be driven by the central gear; and screws extending from the planetary gears. These planetary screws may have reverse threads so the central gear may be driven clockwise by a Philips head, flat head, Allen head or other bit configuration to advance the screws into the support. A clip may be used to center wiring between the screws and limit the depth to which the screws are driven into the support. The clip may be integral to the housing or integral standoffs may be provided to define a specific clearance between the housing and the support to prevent damage to the wiring.

12 Claims, 8 Drawing Sheets

(56) References Cited

U.S. PATENT DOCUMENTS

| | | |
|---|---|---|
| 9,186,143 B2 | 11/2015 | Timm et al. |
| 9,222,496 B2 * | 12/2015 | Bernardin .......... A47B 47/0008 |
| 2007/0049943 A1 * | 3/2007 | Moskowitz ........ A61B 17/0642 |
| | | 606/279 |
| 2016/0220247 A1 | 8/2016 | Timm et al. |
| 2016/0249911 A1 | 9/2016 | Timm et al. |

* cited by examiner

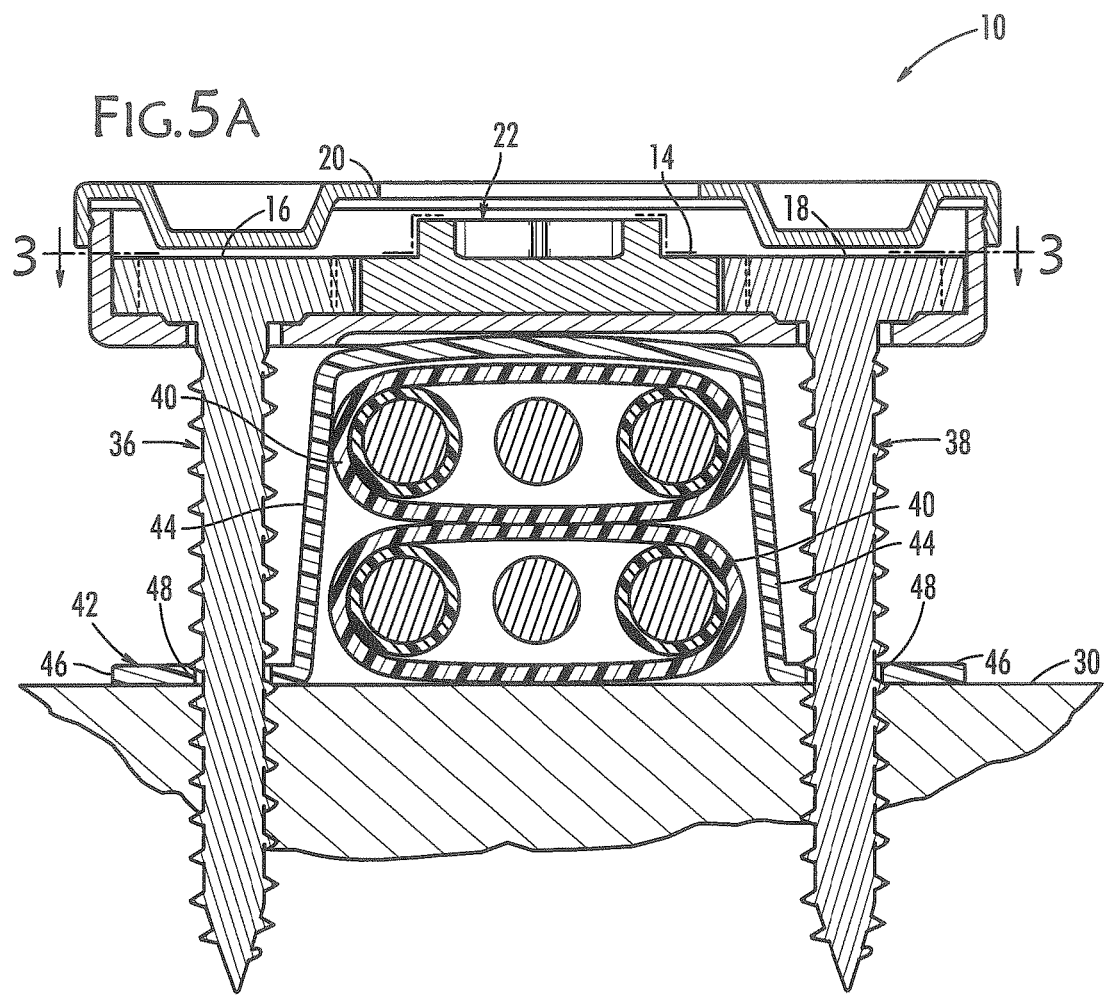

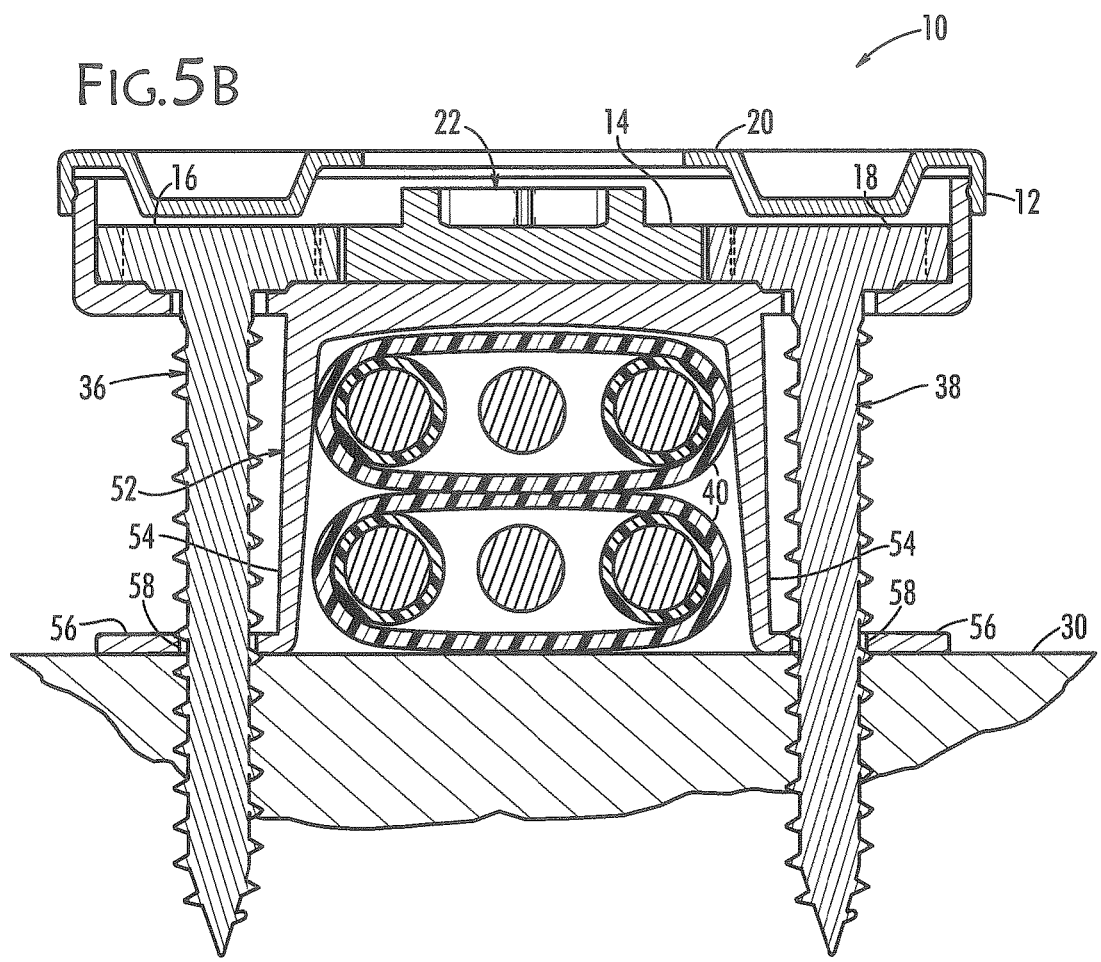

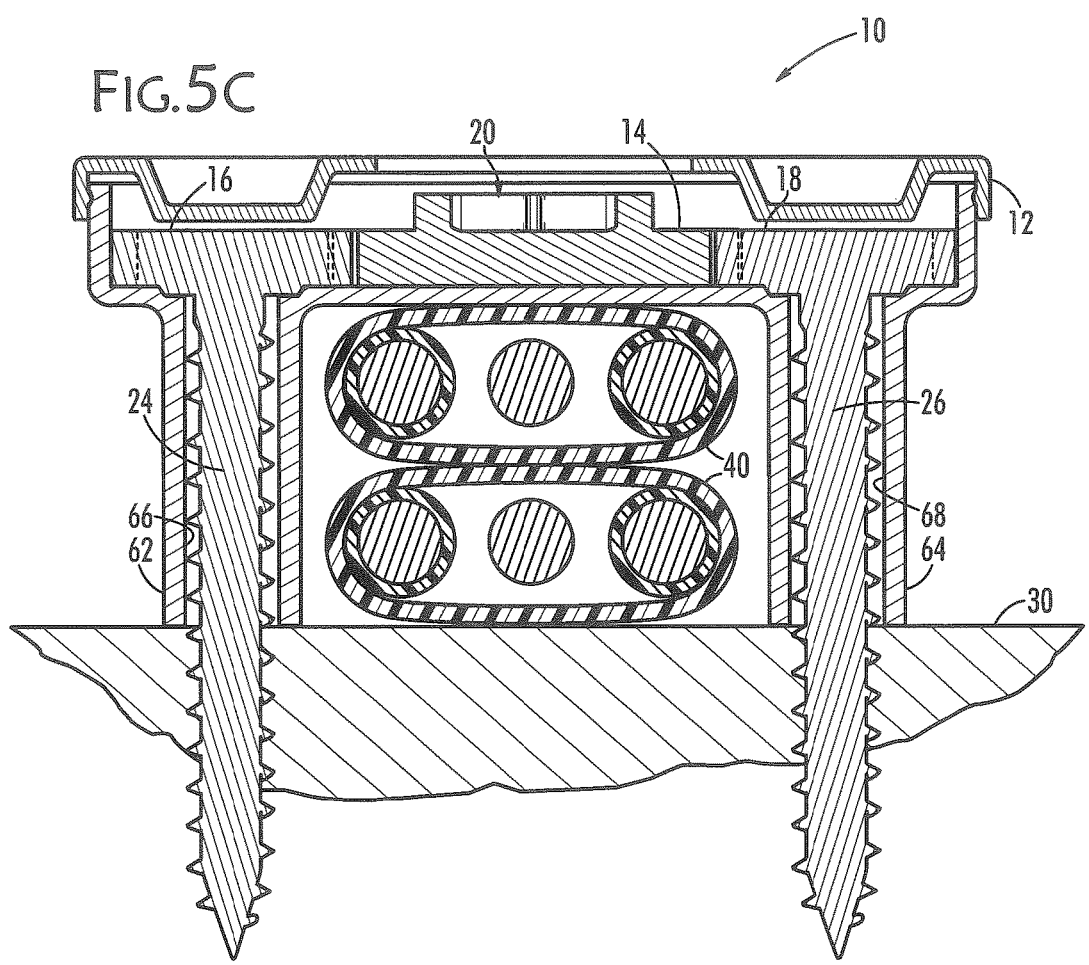

US 10,087,971 B1

PLANETARY STAPLER FOR ELECTRICAL WIRING AND THE LIKE

TECHNOLOGY FIELD

The invention relates to staples for holding wiring to a support surface and tools for use in driving staples into a surface.

SUMMARY

A staple is disclosed for fastening electrical wiring and the like to a support. The staple includes a housing, a central gear configured to be driven by a tool, a first and second planetary gear positioned to be driven by the central gear; and a first and second screw. The first screw extends from the first planetary gear and the second screw extends from the second planetary gear. The first and second planetary gears may be arranged to be diametrically opposed to each other with the central gear between them. The first and second screws may carry reverse threads if the central gear is driven in the normal, clockwise direction. The top surface of the central gear may be configured to receive a screw driver or a drill bit. The central gear's top surface may be configured to receive a flat head, cross slot head, Allen head or other driver configuration.

A clip may be used with the housing and the screws to center wiring in place between first and second screws and regulate the depth to which the screws are driven into the support. Alternatively, the clip may be integral or, for some embodiments, there may be integral standoffs formed in the housing to define a specific clearance for the wiring to prevent damage to the wiring.

BRIEF DESCRIPTION OF THE DRAWINGS

In the drawings,

FIGS. 5A, 5B, 5C show three alternative aspects of the disclosed staple including a first aspect showing a separate plastic clip in FIG. 5A, a second aspect having an integral clip in FIG. 5B, and a third aspect having standoffs in FIG. 5C.

DETAILED DESCRIPTION

Figure 1:
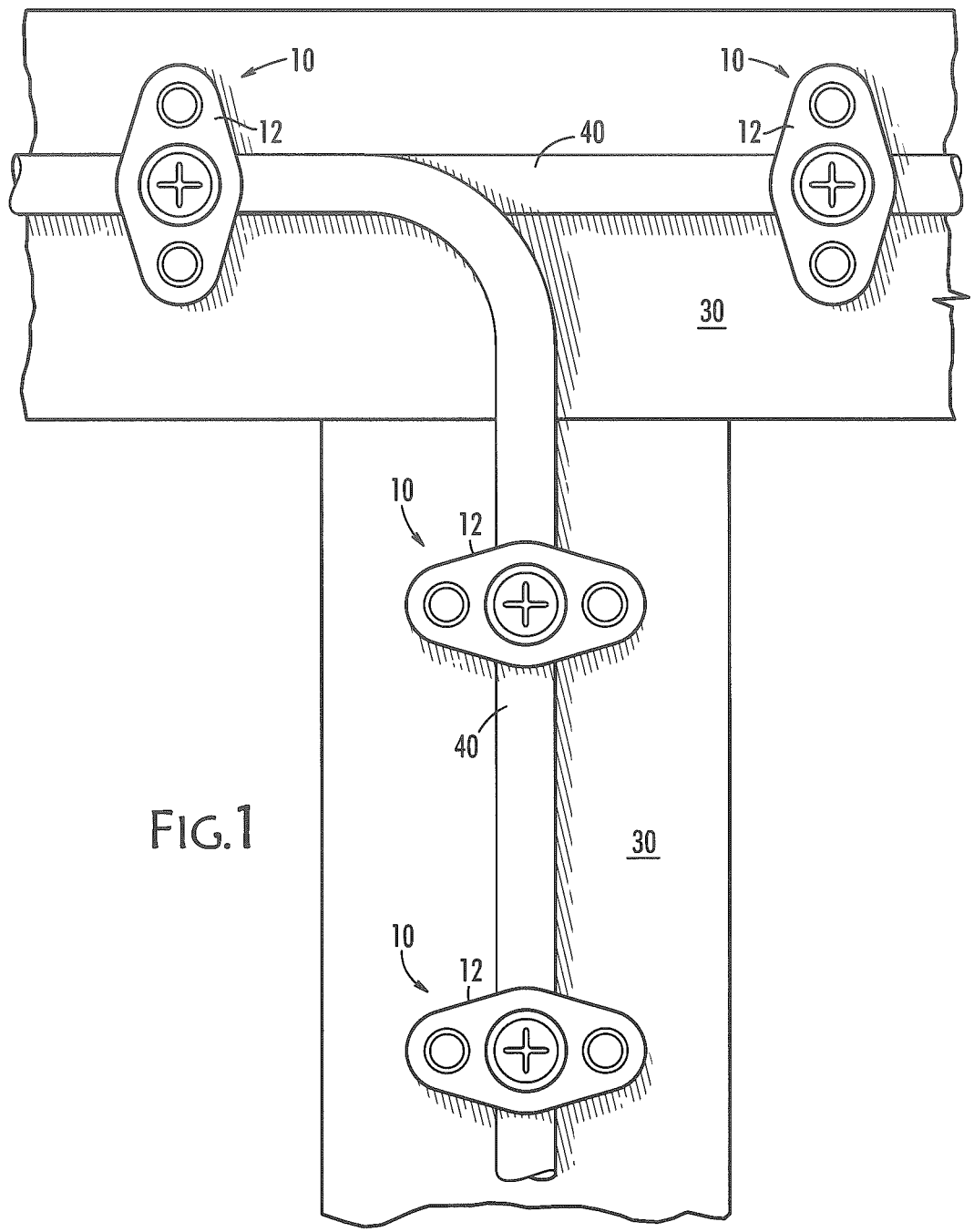
FIG. 1 is a top view of electrical wiring stapled to a support using the present staples.

Referring now to the figures, a staple 10 is shown in use in FIG. 1. The term staple refers generally to a device for fastening another object to a support 30. Here, the present staple 10 is intended to be used to fasten one or ore long, thin objects 40 such as electrical wiring, communications cables, fiber optic cables, conduit, rope lighting, and other objects that have a major dimension much longer than their minor dimensions. These objects 40 are fastened to a support 30 such as a beam, truss, stud, joist, and the like, which may be made of wood, wood products, synthetic materials, masonry, or other material that is capable of having a steel screw drilled into it.

Figure 2:
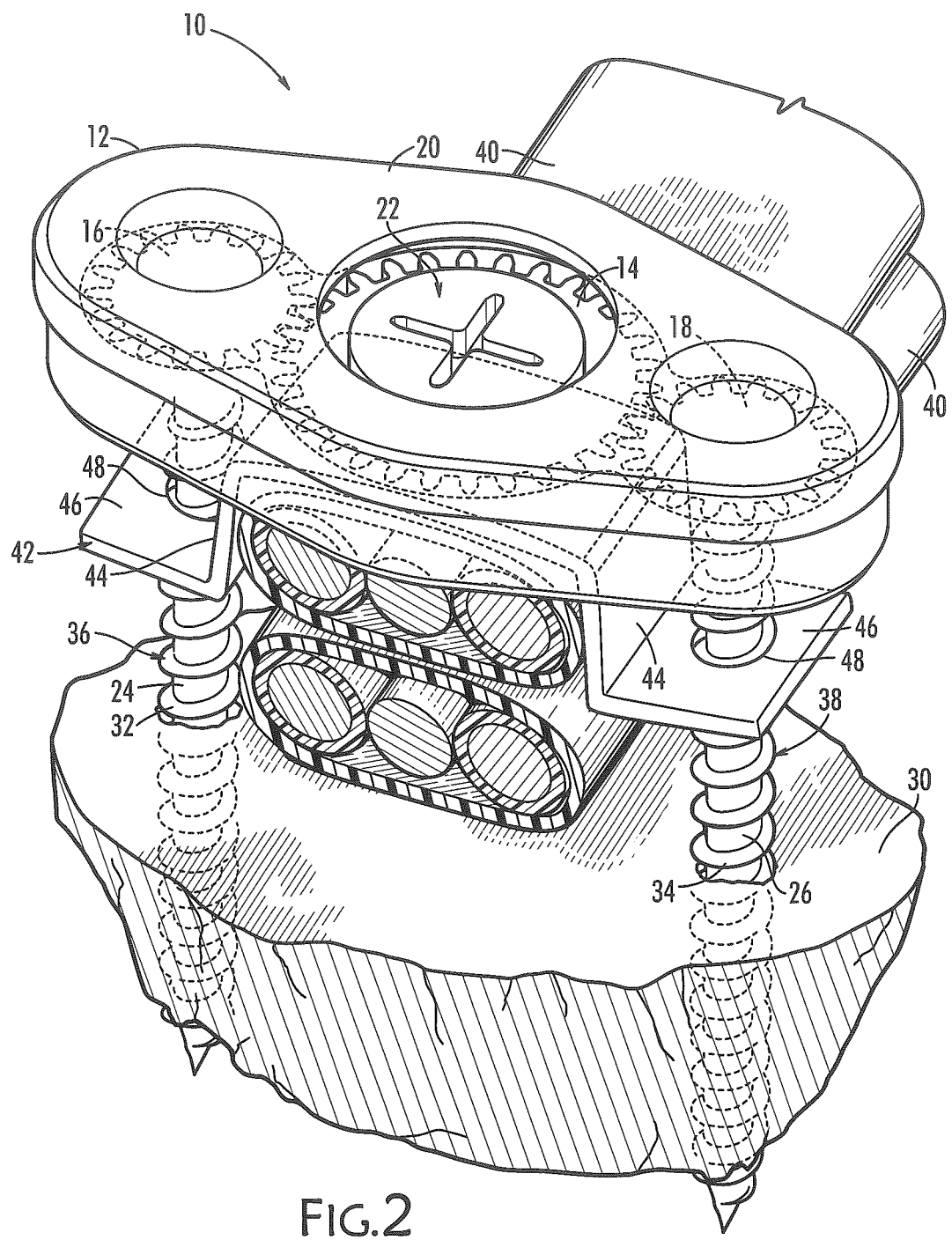
FIG. 2 is a top perspective view of the present staple with stacked electrical wires, partially driven into a support.
Figure 3:
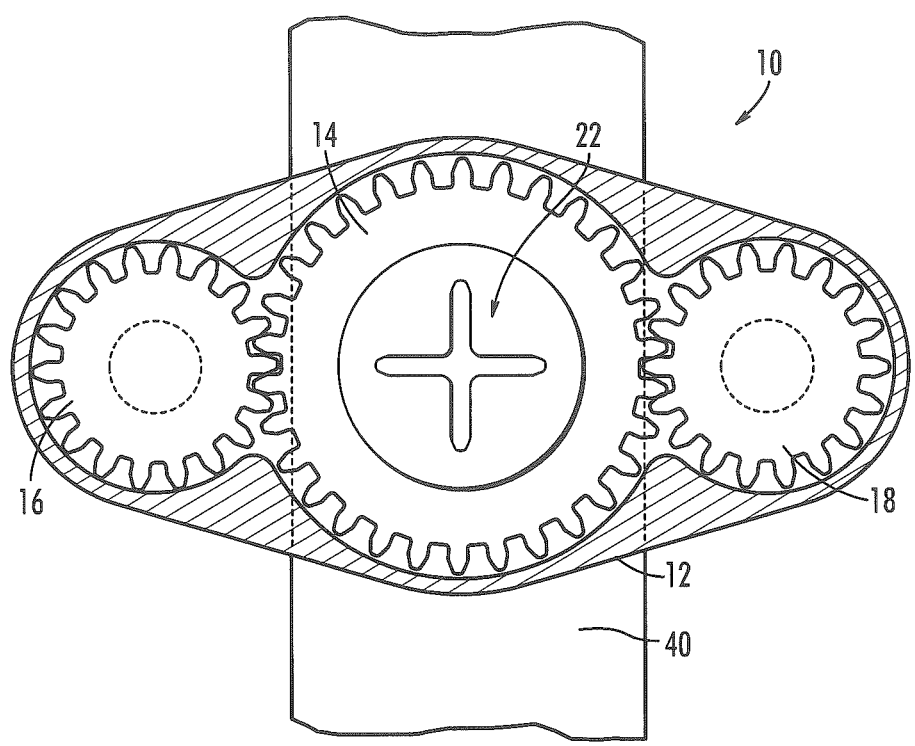
FIG. 3 is a top view of the present staple with electrical wiring.

Referring now to FIG. 2, where staple 10 is shown in perspective, staple 10 includes a housing 12 which may be made of plastic, metal, ceramic or combinations of these. In housing 12 is a central gear 14 and two planetary gears, namely, a first planetary gear 16 and a second planetary gear 18 spaced apart from first planetary gear 16. First and second planetary gears 16, 18, are arranged so that the teeth of central gear 14 mesh with the teeth of first and second planetary gears 16, 18, with central gear 14 positioned between them in order to cause simultaneous rotation of first and second planetary gears 16, 18, when central gear 14 is rotated. If central gear 14 is rotated clockwise, first and second planetary gears 16, 18, rotate counter-clockwise. First and second planetary gears 16, 18, diametrically oppose each other and are spaced apart to receive central gear 14 between them.

Housing 12 may be rigid to hold gears 14, 16, 18, in engagement when they are rotating against the resistance of support 30.

Figure 4:
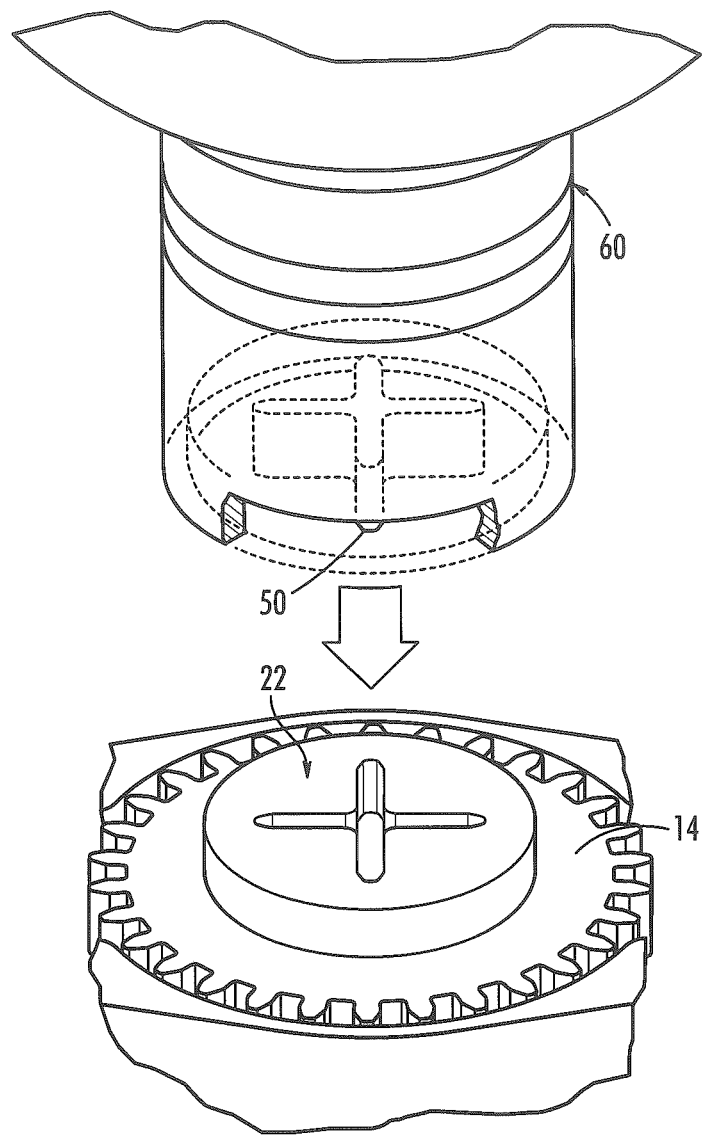
FIG. 4 is a side perspective view of a detail of the present staple showing the central gear and a tool for driving same.

Central gear 14 has a top surface 20 having a configuration 22 that receives a bit 50 in a tool 60, such as a screw driver with a cross slot head, a flat head, a hexagonal head, or a tool bit with one of these shapes or a different one capable of transferring torque of the tool to central gear 14, as best seen in FIG. 4. The term configuration means that the top surface of central gear 14 has a shaped that corresponds to the shape of a bit 50 so that bit 50 can engage configuration 22 and drive it in either clockwise or counter-clockwise direction. Configuration 22 and bit 50 may correspond in a male/female manner or other mutually locking engagement. For example, configuration 22 may be a negative configuration (that is, a recess as shown in FIGS. 2-5A, B, and C) or a positive configuration (that is, an extension having the same dimensions as the recess). When central gear 14 is rotated by bit 50 of tool 60 in a particular direction, planetary gears 16, 18, rotate in the opposing direction.

The present invention is also the combination a tool 60, as shown in FIG. 4, and plural staples 10, perhaps held in alignment in a series within a magazine in operational connection with tool 60 to allow a staple 10 to be fed automatically into position where it can be driven by tool 60. Tool 60 may be a screw driver or a power drill, which may be electric or pneumatic drill that may drive a Philips head bit when central gear 14 has a corresponding configuration 22 for receiving a Philips head bit 50

The present invention is also a tool bit 50 that fits the chuck of any of many conventional hand or power tools such as hand drills, cordless electric drills, and impact wrenches.

As shown in FIGS. 2 and 5A-5C, first and a second screw 24, 26, with threads 32, 34, respectively, extend from first and second planetary gears 16, 18, respectively, and preferably integrally, that is, first planetary gear 16 and first screw 24 are made as one part, and second planetary gear 18 and second screw 26 are made as one part. First planetary gear 16 with first screw 24, and second planetary gear 18 with second screw 26, when integrally made, will be designated first and second planetary screws 36, 38, respectively. First and second threads 32, 34, on first and second planetary screws 36, 38, respectively, may be forward threads (driven clockwise) or reverse threads (driven counterclockwise) so that central gear 14 can be driven in the reverse direction or the forward direction, respectively, and still advance screws 24, 26 into support 30.

Staple 10 may include a clip 42, as shown in FIGS. 2 and 5A, that acts to center and protect objects between first and second planetary screws 36, 38. Clip 42 has opposing legs 44, each with a lateral flange 46 with a hole 48 formed therein to be large enough for one of first and second planetary screws 36, 38 to pass through. First and second screws 24, 26, thus help to hold clip 42 in position under housing 12 and centered between first and second planetary screws 36, 38.

Clip 42 prevents excessive tightening of staple 10 to support 30 and also prevents damage to objects 40 from abrasion by first and second threads 32, 34, as first and second planetary screws 36, 38 are driven on either side of objects 40.

An alternative aspect of staple 10 is an integral clip 52, as shown in FIG. 5B. Integral clip 52 may be manufactured as part of housing 12 to reduce the number of parts. Clip 52 may have the same configuration as clip 42, with legs 54, lateral flanges 56 and holes 58 in lateral flanges 56, or may have a somewhat different configuration if housing 12 is made by molding it in one piece. For example, lateral flanges 56 may be eliminated and legs 54 may curve slightly around first and second screws 24, 26.

Another alternative aspect of staple 10 is shown in FIG. 5C. Housing 12 may have a first and second stand-offs 62, 64, spaced apart and arranged so that first and second screws 24, 26, respectively, extend through holes 66, 68 in first and second stand-offs 62, 64, respectively. First and second stand-offs 62, 64, limit screws 24, 26, from being driven into support 30 beyond the point where stand-offs 62, 64 touch support thereby leaving a fixed distance—or stand-off— between support 30 and the underside of housing 12 without damage to objects 40.

Figure 6:
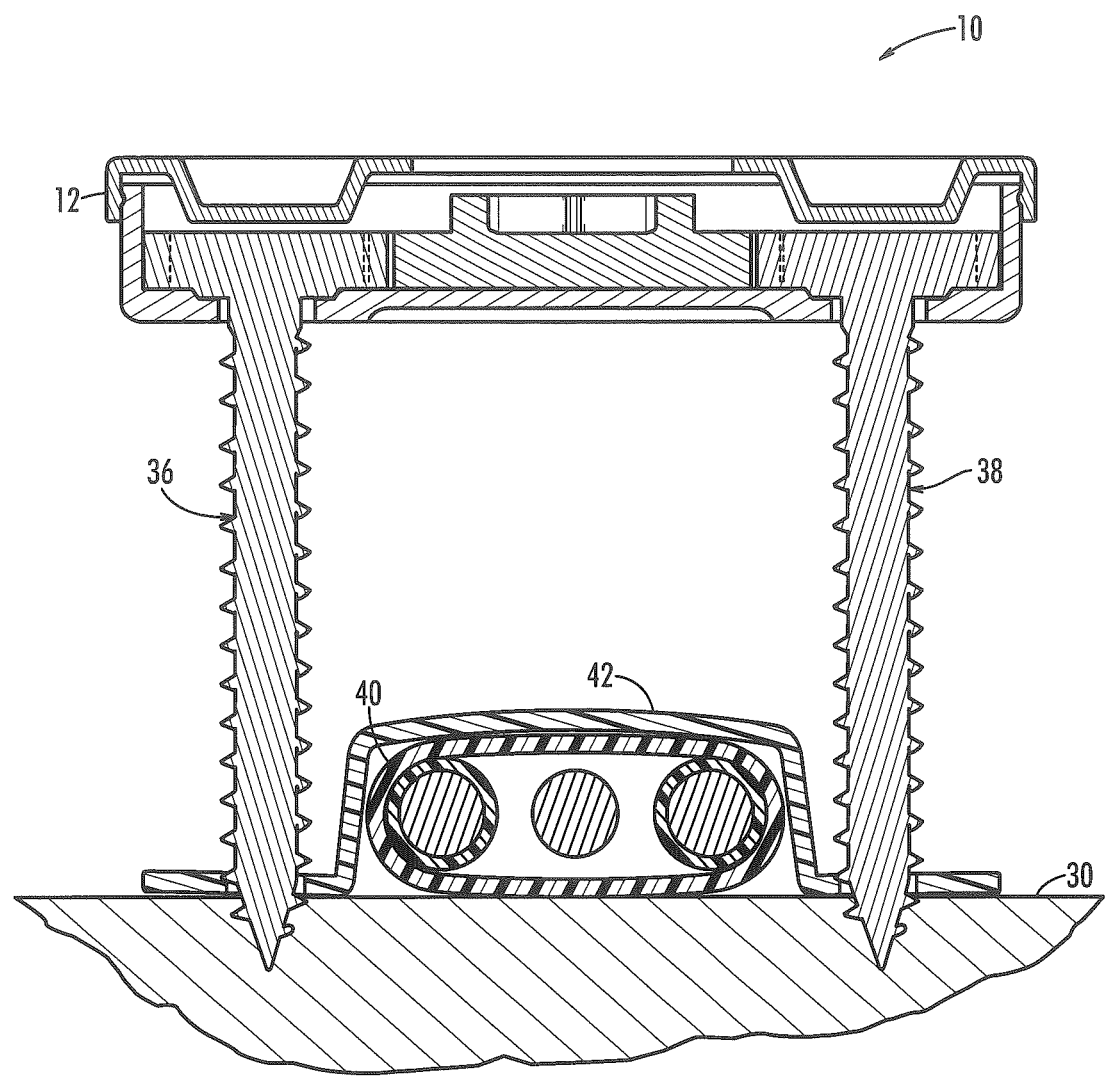
FIG. 6 is a side cross-sectional view of the staple with a plastic clip used to secure a single cable to a surface.

Another alternative aspect of staple 10 is shown in FIG. 6 in which staple 10 may include a clip 42, as shown in FIG. 5A, that acts to center and isolate a single cable 40 between first and second planetary screws 36, 38.

Those skilled in the art of construction and installation of utilities in buildings under construction will appreciate that many modifications and substitutions may be made to the forgoing description of aspects without departing from the spirit and scope of the disclosure.

What is claimed is:

1. A device for use in attaching wiring to a surface, said device comprising:
   a tool with a bit;
   a plurality of staples, a staple of said plurality of staples having
      a housing,
      a central gear carried by said housing, and
      a first planetary gear and a second planetary gear spaced-apart from said first planetary gear, said central gear being positioned in engagement with said first planetary gear and said second planetary gear so as to drive said first planetary gear and said second planetary gear simultaneously, said central gear having a top surface; and
      a first screw attached to said first planetary gear and a second screw attached to said second planetary gear, and wherein said central gear has a top surface with a configuration that is operable to receive said bit of said tool and to rotate when said tool applies torque to said bit, said first and said second planetary gears and said first and second screws rotating in response to rotation of said central gear.

2. The device as recited in claim 1, wherein said first planetary gear and said planetary second gear are carried by said housing.

3. The device as recited in claim 1, wherein said first screw is formed integral with said first planetary gear and said second screw is formed integral with said second planetary gear.

4. The device as recited in claim 1, wherein said first screw and said second screw have reverse threads.

5. The device as recited in claim 1, wherein said staple of said plurality of staples further comprises a clip running between said first screw and said second screw.

6. The device as recited in claim 5, wherein said clip is formed integral to said housing.

7. The device as recited in claim 5, wherein said clip includes a first leg and a second leg, said first leg having a hole formed in said first leg through which said first screw passes and said second leg having a hole formed in said second leg through which said second screw passes.

8. The device as recited in claim 5, wherein said housing and said clip are formed by molding.

9. The device as recited in claim 1, wherein said tool is a power tool.

10. The device as recited in claim 1, wherein said tool is a torque wrench.

11. The device as recited in claim 1, wherein said bit has a projection and said central gear has a recess, and wherein said recess is operable to receive said projection.

12. The device as recited in claim 11, wherein said projection is a cross-slot head screw driver.

* * * * *